United States Patent [19]
Emmerson

[11] 3,715,560
[45] Feb. 6, 1973

[54] WELDING PROGRAMMER

[76] Inventor: John O. Emmerson, c/o Magnatech, The DSD Company, Bradley Park, East Granby, Conn. 06026

[22] Filed: March 1, 1971

[21] Appl. No.: 119,735

[52] U.S. Cl. .............................. 219/131 R, 219/108
[51] Int. Cl. ............................................... B23k 9/10
[58] Field of Search........219/131, 124, 125, 137, 60, 219/61, 97, 108; 338/89, 118, 162

[56] References Cited

UNITED STATES PATENTS

| | | | |
|---|---|---|---|
| 3,207,881 | 9/1965 | Pagan................................ | 219/60 A |
| 3,253,118 | 5/1966 | Frederick.......................... | 219/131 |
| 3,522,412 | 8/1970 | Bell et al. ......................... | 219/137 |
| 3,162,833 | 12/1964 | MacLain............................ | 338/89 |

FOREIGN PATENTS OR APPLICATIONS

| | | | |
|---|---|---|---|
| 975,959 | 11/1964 | Great Britain................... | 219/131 R |
| 651,098 | 10/1962 | Canada............................ | 219/131 R |

*Primary Examiner*—R. F. Staubly
*Assistant Examiner*—Gale R. Peterson
*Attorney*—Prutzman, Hayes, Kalb & Chilton

[57] ABSTRACT

A portable programmer for an automatic orbital tube welder comprises a turntable for mounting a shaped cam which is engaged by the stylus of a control arm to control the welding current through the use of a potentiometer having a wiper connected to the control arm. The turntable is rotated at a speed proportional to the speed of the welding head so that the rotation of the cam controls the welding current throughout all the orbits of the welder around the tube required to produce the weld. A support plate for indexing the cam on the turntable is mounted by a self-centering clutch comprising a resilient O-ring carried by the turntable platen and a flange on the support plate having a locking taper for engaging the O-ring.

13 Claims, 3 Drawing Figures

WELDING PROGRAMMER

BACKGROUND AND SUMMARY OF THE INVENTION

The present invention relates generally to a welding programmer for an automatic welder and is particularly concerned with a new and improved electromechanical programmer for a single or multi-pass portable welder.

The increased demand in recent years for repetitive high quality welding of tubular and flat structures using single or multi-pass welding techniques has developed the need for automatic welding equipment which eliminates the human factor from repetitive welding operations. To fully meet this demand in butt welding tubes requires an automatic welding program which permits the weld bead to be formed in other than a horizontal plane and must take into account gravity effects requiring variation in the welding current as the welding electrode proceeds up one side of a tube against the force of gravity, across the top of the tube and down the other side of the tube with the force of gravity. Moreover, precise control of the welding current and the traverse speed of the welding electrode in any single or multi-pass welding procedure is normally accomplished by the skill of a human operator.

Automatic single and multi-pass welding equipment has heretofore been accomplished through the use of program welding involving a bank of computer-type controls with punched cards making such devices expensive and complicated and limiting their application.

It is the object of this invention to provide a new and improved programmer for a single or multi-pass welder which is inexpensive and simple to use. Included in this object is the provision of a portable electromechanical programmer for an automatic welding system.

Another object of this invention is to provide a new and improved method of and apparatus for the duplication of uniformly precision controlled welds in the single or multi-pass butt welding of tubes. Included in this object is the provision of a programmer having the capability of producing superior quality welds despite the varying gravity effects in the generation of the weld bead.

A further object of this invention is the method of and apparatus for the development of a control cam for the electromechanical programmer of this invention.

Still another object of this invention a is to provide a new and improved arrangement for indexing and fixing the position of the control cam relative to the welding electrode at the beginning of an automatic welding sequence. Included in this object is the provision of a readily releasable nonslip clutch for mounting the control cam on the electromechanical programmer.

Other objects will be in part obvious and in part pointed out more in detail hereinafter.

The invention accordingly consists in the features of construction, combination of elements and arrangement of parts which will be exemplified in the construction hereafter set forth.

DESCRIPTION OF A PREFERRED EMBODIMENT

Figure 1:
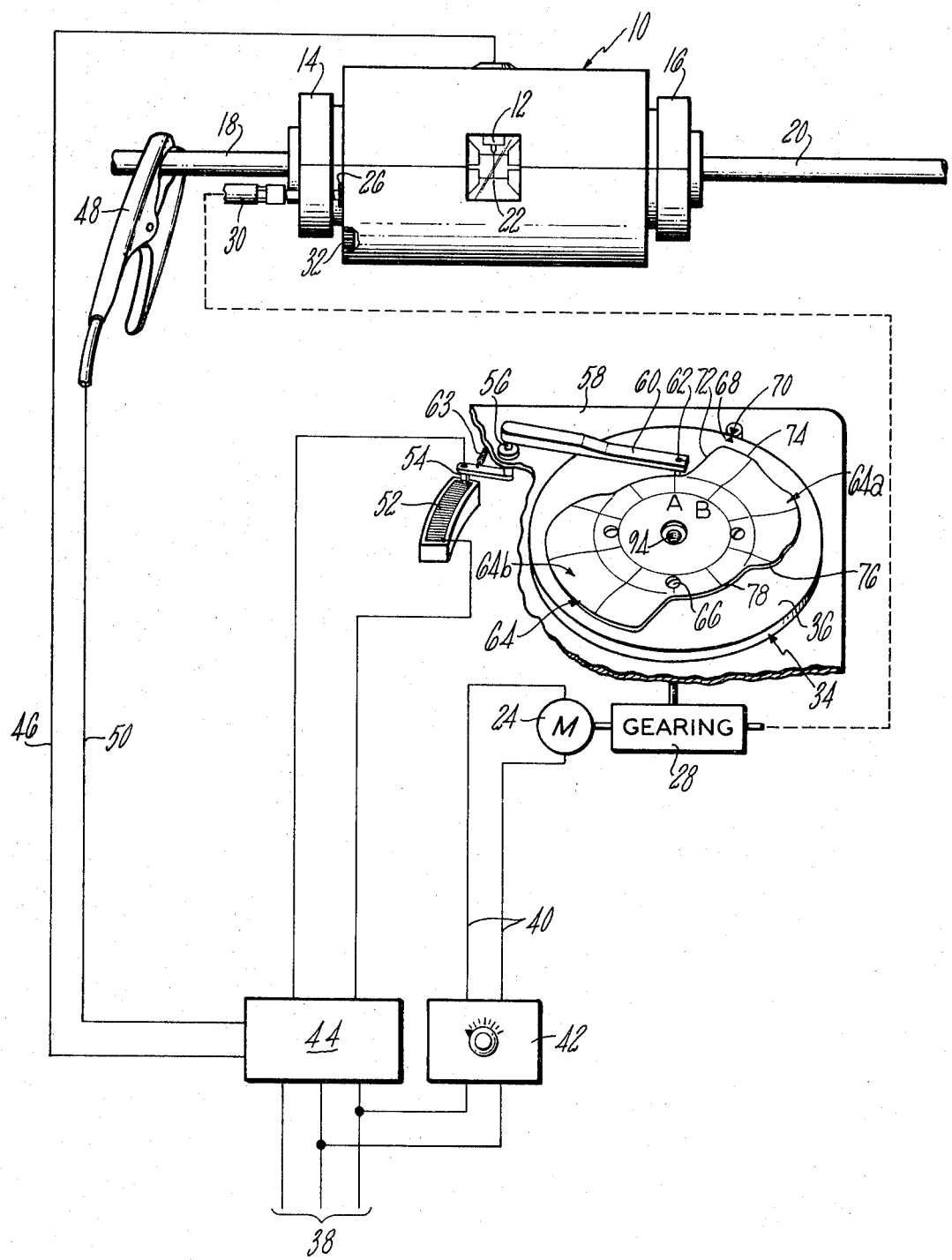
FIG. 1 is a partial schematic view of an automatically controlled welder illustrating the electromechanical programmer of this invention in a multi-pass orbiting welder for butt welding tubular members.

Referring to the drawings in greater detail wherein like reference numerals indicate like parts, the present invention is illustrated in connection with an orbital tube welder 10 mounting a welding electrode 12 which is rotatably supported relative to a pair of aligning and clamping assemblies 14, 16. Assemblies 14,16 support two pieces of tubing 18,20 with their abutting ends 22 in alignment with the welding electrode 12.

A drive motor 24 is connected to a drive pinion 26 through reduction gearing 28 and drive shaft 30. Drive pinion 26 meshes with ring gear 32 to rotate the electrode 12 in an orbit around the butt joint 22 through a single pass or a plurality of passes as required for welding the ends of tubing 18,20 together.

The operation and construction of the orbital tube welder 10 is more fully disclosed and described in my pending application Ser. No. 110,935 filed Jan. 29, 1971, now U.S. Pat. No. 3,668,359 and entitled "Clamping and Welding Assembly."

In accordance with one aspect of this invention, I provide an electromechanical programmer for automatically controlling the speed of movement of the electrode 12 across the workpiece as well as the amperage during all portions of the welding cycle.

As shown in FIG. 1, the programmer comprises a turntable 34 on which a removable support and indexing plate is positioned. The turntable 34 is rotated at a speed proportional to the speed of the orbital welder 10 through gearing 28 so that the electrode 12 is rotated a fixed number of complete revolutions, say 10, for one revolution of the turn table 34.

The motor 24 is connected to an electrical supply source 38 through conductors 40 and speed controller 42 which controls the speed of electrode 12 across the workpiece at the desired level. The electrode 12 is connected to the output of regulated power supply 44 through a conductor 46 with the tubing 18 being grounded through a clamp 48 and conductor 50. The regulated power supply may be of any suitable type for controlling the welding current passing from electrode 12 to the joint being welded.

The output current of regulated power supply 44 is controlled by a potentiometer 52 having a wiper 54. The wiper 54 is nonrotatably fixed relative to shaft 56 which is journalled in a base plate 58 for the turntable 34. The other end of the shaft 56 is nonrotatably fixed to the control arm 60, and a cam follower stylus 62, which is preferably formed of polytetrafluroethylene or other suitable low friction material, is secured to the free end of the control arm 60.

A control cam 64, shaped to control the position of the wiper 54 on the potentiometer 52 to control the number of orbits of the welding electrode 12 and the welding current levels required for a particular weldment, is mounted on indexing and support plate 36 by a plurality of screws 66 which, as shown, are asymmetrically disposed relative to the support plate.

With the electrode 12 positioned at a preselected rotational position with respect to the abutting ends of tubing 18,20, the indexing and support plate 36 is mounted on the turntable with its index marker 68 aligned with index marker 70 fixed on base plate 58 to position the stylus at the correct rotational position with respect to the cam 64 to synchronize the cam plate with the electrode 12.

Upon energizing the motor 24 and regulated power supply 44, the motor rotates the welding electrode 12 and the turntable 34 at relative speeds determined by the gearing 28. As the turntable 34 rotates, the stylus 62 engages the leading edge 72 of the cam lobe 64a to shift the wiper 54 on potentiometer 52 and initiate the flow of welding current. The welding current increases at a rate or gradient dependent upon the angular relationship of the leading edge 72 of the cam to a radius of the turntable. Stylus 62 is held in contact with the leading edge 72 by a radially inward bias applied to control arm 60 by any suitable means, such as spring 63.

In the illustrated embodiment, a complete orbit of the welding electrode 12 corresponds with an angular movement of the turntable 34 from A to B, i.e., 36°. Accordingly, cam lobe 64a maintains a welding current at a level corresponding with the shape of the outer periphery 74 of cam lobe 64a for approximately two revolutions, after which time the stylus 62 will follow the trailing edge 76 of cam lobe 64a to reduce the current according to a prescribed schedule during the final orbiting movement of the welding electrode 12 with respect to the workpiece.

When the stylus engages the circumferential surface 78 of the cam, the welding operation is completed and the regulated power supply 44 and the motor 24 are thereafter de-energized by any suitable means (not shown).

As indicated above, a programmer having the orbit-to-turntable ratio of the illustrated embodiment may control the welding electrode 12 up to ten complete orbits or passes over the workpiece. Where, as in the specific embodiment illustrated, a smaller number of orbits or passes is required for a weldment, the control cam 64 may be provided with a second cam lobe 64b for controlling the welding of tubing made of a different alloy or of a different diameter or wall thickness.

Another feature of this invention is the method and apparatus for developing or fabricating a control cam 64 for use in the automatic programming of the welding of a particular weldment.

Figure 2:
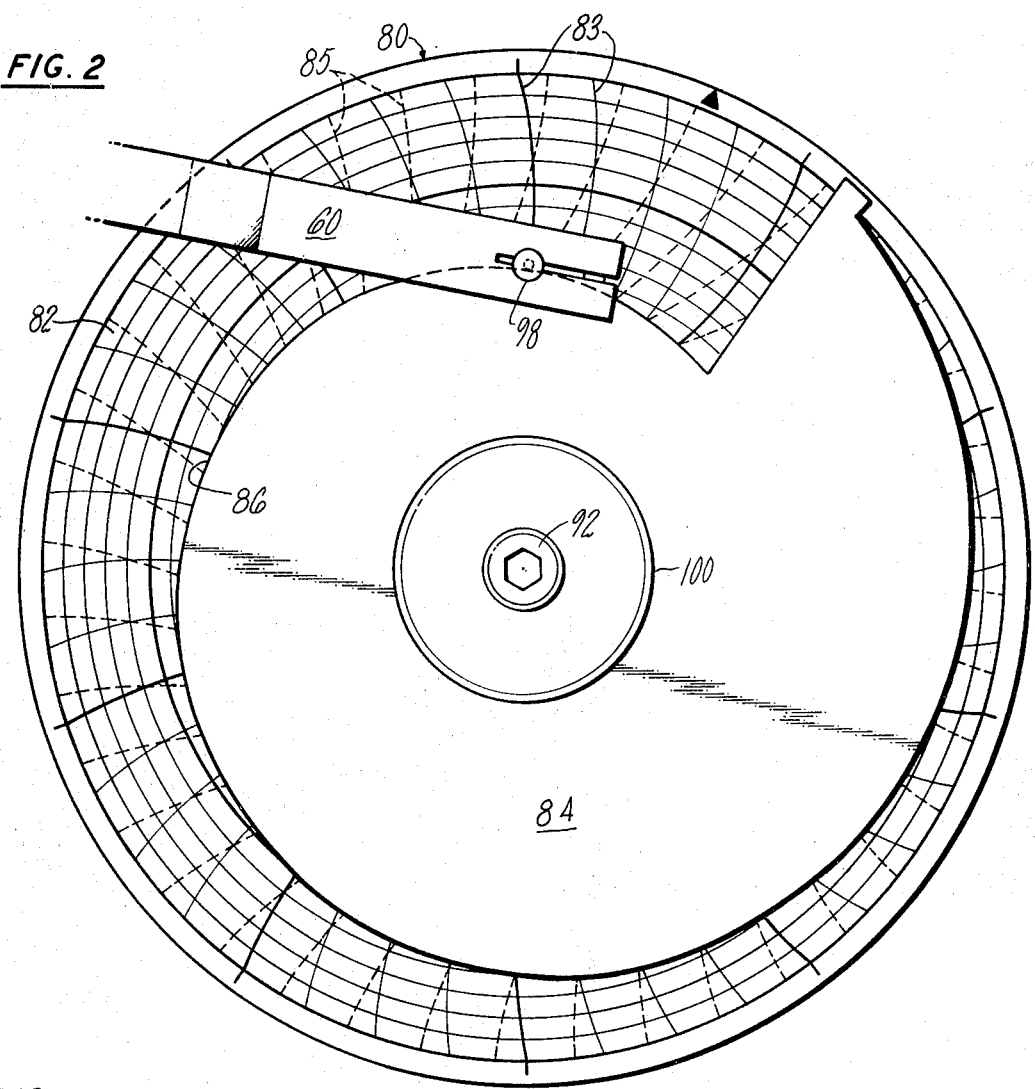
FIG. 2 is a top view of the turntable of the electromechanical programmer for illustrating the development of a control cam.
Figure 3:
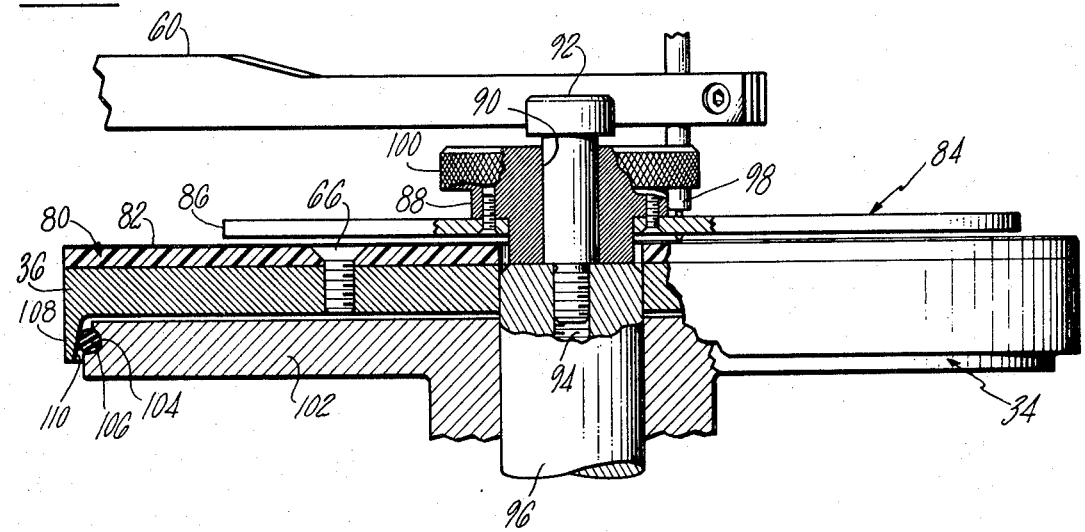
FIG. 3 is a fragmentary cross-sectional view of the turntable of FIG. 2.

As shown in FIGS. 2 and 3, a disc 80 formed of any suitable material such as plexiglass, is mounted on the index and support plate 36 by screws 66 and a cam card blank 82 having a plurality of concentric circles representing differing current levels from no current to full current thereon is applied to the disc 80 as, for example, through the use of an adhesive backing. Blank 82 is preferably provided with generally radial lines 83 which described the arc of stylus 62 on control arm 60 to denote the beginning, ¼, ½ and ¾ position of each orbit or pass of electrode 12. Broken lines 85 may also be provided to denote the steepest slope permissible for the leading edge of a cam lobe suitable for guiding stylus 62.

A jig 84 having a helical outer periphery 86 and an apertured central hub 88 is placed over the disc 80.

The jig 84 is concentrically located by a bolt 92 passing through aperture 90 and threaded into aperture 94 of turntable shaft 96. The hub 88 bottoms in a recess at the top of turntable shaft 96 to space the jig 84 from the disc 80.

The stylus 62, as shown in FIG. 1, is removed from the control arm 60 and replaced by a marker, such as ball point pen 98. With the disc 80 indexed with the index marker 70, the motor 24 and the regulated power supply 44 are energized and the operator, possessing a previously experimentally determined weld program, including electrode speed, current variation within an orbit, and the number of orbits, sets the speed of motor 24, and controls the welding current by rotating the jig 98 by the knurled knob 100 to move the control arm 60 to the desired radial position to set the proper current requirements to make a sample weld. As the operator manually controls the welding current through control knob 100 and the jig 84, the marker 98 traces a line on the cam card blank 82 to record the welding current used throughout each orbit or pass of the welding sequence to graphically record the requirements for making and duplicating the sample weld.

After a sample weld of the desired quality is completed, the trace produced by the marker 98 creates the cam profile required for repetitive welds of the same quality. The cam 64 required for this may be formed by removing the portion of the disc 80 outwardly of the trace to create a cam having the profile required for duplicating the same weld schedule in a push-button operation when the cam is used as described above.

The ease of indexing the index and support plate 36 with respect to the reference marker 70 to synchronize the location of a cam 64 with the preselected position of the welding electrode 12 relative to the workpiece is essential in the practice of this invention. As shown in FIG. 3, the turntable platen 102 is provided with a peripheral recess 104 for receiving a resilient O-ring formed of a suitable material such as neoprene. The index and support plate 36 is provided with a depending peripheral flange 108 which surrounds the O-ring and is provided with a tapered inner surface 110 having a taper angle of the order of 4 with the axis of turntable shaft 96. As a result of this taper and the resiliency of the O-ring 106, the indexing and supporting plate 36 is automatically self-centering and is quickly and easily removable for indexing while at the same time is firmly supported with respect to the turntable base 102 to guard against relative angular slippage after indexing.

From the foregoing, it is apparent that this invention provides a portable electromechanical programmer for a single or multi-pass welder which is simple and foolproof in design and use in the repetitious welding of precision welds for workpieces of any configuration with the weld bead disposed at any position relative to horizontal.

While the invention is described with specific reference to an orbital welder, it is apparent that it is also applicable to a single or multi-pass welder in which the electrode traverses a precise path across a flat workpiece at a preselected speed ratio with the programmer.

As will be apparent to persons skilled in the art, various modifications, adaptations and variations of the foregoing specific disclosure can be made without departing from the teachings of the present invention.

I claim:

1. A programmed welder comprising a welding electrode, means for moving the electrode relative to a workpiece for producing a weld bead, a programmer to control the speed of movement of the electrode relative to the workpiece and the level of welding current, said programmer including a cam having a profile representative of the current requirements of the weld throughout of the welding sequence including profiles which cause application of current at the weld start position and cessation of current at the weld stop position and further including at least one additional profile wherein current is applied at a level other than that at said two positions, a cam follower, means for producing relative movement between the cam and the cam follower in synchronism with the movement of the electrode relative to the workpiece, and automatic means responsive to the cam follower to automatically control the level of the welding current during the welding sequence at a variable level corresponding to the profile of the cam.

2. The welder of claim 1 wherein the electrode makes a plurality of passes across the workpiece during the welding sequence.

3. The welder of claim 1 wherein the cam is mounted on a turntable and the cam follower comprises a control arm having a stylus biased against the cam profile to control the position of the control arm to regulate the welding current in response to the rotation of the turntable.

4. The welder of claim 3 in which a potentiometer having a wiper fixed to the control arm provides the control signal for regulating the welding current.

5. The welder of claim 1 adapted for butt welding tubular workpieces wherein the electrode is mounted for orbital movement around the workpiece.

6. The welder of claim 5 wherein the electrode makes a plurality of orbits during the welding sequence.

7. A programmer for controlling the level of welding current in duplicating welding beads in repetitive welding operations comprising a turntable, a cam mounted on the turntable to rotate therewith, said cam having a profile representative of the current requirements of the weld throughout the welding sequence including profiles which cause application of current at the weld start position and cessation of current at the weld stop position and further including at least one additional profile wherein current is applied at a level other than that at said two positions, a control arm having a cam follower engaging the profile of the cam, and automatic means responsive to the position of the control arm adapted to automatically control the level of the welding current during the welding sequence at a variable level corresponding to the profile of the cam.

8. The programmer of claim 7 wherein said position responsive means is a potentiometer having a wiper fixed to the control arm.

9. The programmer of claim 7 wherein the cam is mounted on a removable support plate, said support plate being provided with a reference marker for synchronizing the position of the cam with the position of the welding electrode.

10. The programmer of claim 9 wherein the turntable comprises a platen mounting a peripheral resilient member and said support plate is provided with a downwardly depending peripheral flange surrounding said resilient member, the inner wall of said flange having a downwardly diverging taper and being engageable with said resilient member to automatically center the support plate on said platen upon assembly and to fixedly secure the same thereon against relative angular movement.

11. The programmer of claim 10 wherein the taper angle of said inner wall is on the order of 4°.

12. The method of making a weld bead comprising the steps of moving a welding electrode across a workpiece in at least at a single pass, providing a cam having a profile representative of the current requirements of the weld throughout the welding sequence including profiles which cause application of current at the weld start position and cessation of current at the weld stop position and further including at least one additional profile wherein current is applied at a level other than that at said two positions, and causing a cam follower to follow the contour of the cam profile in synchronism with the movement of the welding electrode to automatically control the level of the welding current in an automatic programmed movement of the electrode throughout the welding sequence at a variable level corresponding to the profile of the cam.

13. The method of claim 12 including the steps of placing the cam on a turntable in a fixed position relative thereto and rotating the turntable at a speed correlated with the speed of movement of the electrode relative to the workpiece.

* * * * *